SWEET SYRUPS

Filed Oct. 4, 1967

Inventor:-
Raoul Walon
By Robert D. Weist Atty.

United States Patent Office 3,475,216

Patented Oct. 28, 1969

1

3,475,216

SWEET SYRUPS

Raoul G. P. Walon, Brussels, Belgium, assignor to Corn Products Company, a corporation of Delaware Continuation-in-part of application Ser. No. 531,345, Mar. 3, 1966. This application Oct. 4, 1967, Ser. No. 672,802

Int. Cl. C13d 3/14

U.S. Cl. 127—46 8 Claims

ABSTRACT OF THE DISCLOSURE

Sweet syrup production by the isomerization of dextrose. Deanionization of a starch conversion syrup by electrodialysis or ion exchange, prior to isomerization, permits the production of sweet syrups having improved properties.

Figure 1:
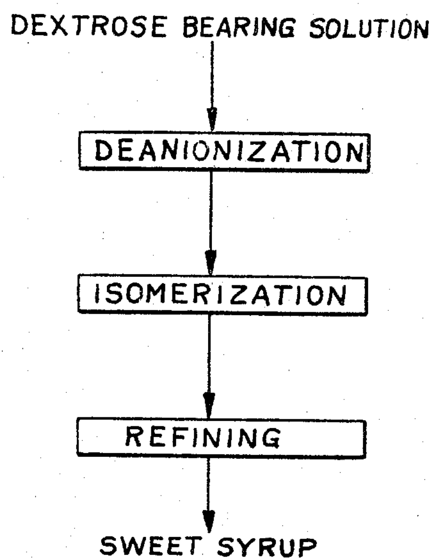

This application is a continuation-in-part of Ser. No. 531,345, filed Mar. 3, 1966.

In general, the present invention relates to improvements in the treatment of sugar solutions so as to produce sweet syrups. In particular, it concerns innovations applicable to a process where dextrose in a dextrose bearing solution, particularly corn syrup, is interconverted to a sweeter sugar, particularly levulose. More particularly, the present invention involves the use of electrodialysis or ion exchange to deanionize a starch conversion syrup prior to interconversion to a sweet syrup.

Starch conversion syrups are conventionally produced by the hydrolysis of starch with mineral acids and/or enzyme(s). These starch conversion syrups, for example corn syrup consist primarily of dextrose (a monosaccharide also known as glucose), maltose (a disaccharide), a small amount of high sugars and dextrins. The amounts of these primary constituents, of course, vary from one syrup to another depending upon a number of different factors. In general, starch conversion syrups are suitable for many purposes but are not fully satisfactory for those uses wherein a high degree of sweetness is required. As mentioned above, dextrose is a primary constituent of starch conversion syrups. Certain isomers of dextrose, particularly that isomer known as levulose (also known as fructose), are sweeter than dextrose. It is well known that dextrose may be interconverted, i.e. isomerized, into levulose. In the prior art attempts have been made to utilize this interconversion to produce syrups sweeter than conventional starch conversion syrups. Various processes for achieving this interconversion have been described in the literature.

The earliest prior art processes for effecting the interconversion presented several practical difficulties. In general, these earlier processes employed alkali in the interconversion reaction which produced a substantial amount of undesirable by-products, for example, organic acids, which not only reduced the sweetness of the syrup but in many instances imparted objectionable flavors. In addition, undesirable color formation was a common and difficult problem.

In the more recently described prior art processes attempts were made to deal with the problems of undesirable by-product and/or color formation in the interconversion process. For example, U.S. Patent 2,746,889 describes an interconversion process wherein the reaction is effected in the presence of a highly basic ion exchange resin and an inert gas. U.S. Patent 3,285,776 describes an interconversion process, employing alkali in the reaction, wherein the pH is continuously maintained within prescribed limits during the interconversion.

Despite the apparent recognition that an acceptable process for producing sweet syrups by interconversion would necessarily provide for the elimination or careful

2 control of undesirable by-product and color formation, it appears that no practical solution has heretofore been developed. For example, the process described in U.S. Patent 2,746,889 requires the expensive regeneration of the highly basic anion exchange resin and presents the problem of providing and maintaining an inert atmosphere. Moreover, it is characterized by an undesirable loss of dextrose by conversion to acid.

It is therefore a primary object of the present invention to provide a practical process for interconverting dextrose into levulose.

It is another object to prepare a sweet syrup without formation of objectionable color bodies and without the development of objectionable flavor.

A further object is to provide a process which does not require an inert atmosphere or alkali in the interconversion reaction.

A still further object is to provide improved sweet syrups.

Other objects of the invention will be obvious to those skilled in the art from the disclosure, including the accompanying drawings, that follows.

Figure 2:
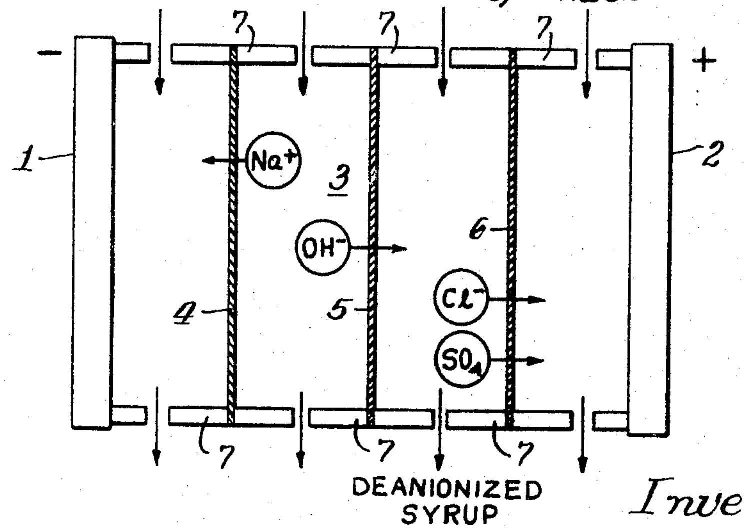

In the drawings, FIGURE 1 is a block diagram of the process of the present invention. FIGURE 2 is a partial cross-sectional view of an electrodialysis unit which can be employed in the present invention.

The present invention is based upon the discovery that deanionization of the dextrose-bearing starting material prior to interconversion is highly desirable. This deanionization removes the mineral anions, e.g. $Cl^-$, $SO_4^{--}$, normally present in the dextrose-bearing starting material and replaces them with $OH^-$ ions. The deanionization also adjusts the pH of the material to the range required for effective interconversion, as further described hereinafter. The deanionization is achieved by the use of a strongly basic anion exchanger or, preferably, by the use of an electrodialysis unit.

Broadly speaking, dextrose-bearing materials may be interconverted to levulose bearing sweet syrups according to the present invention by a process which involves three steps. This process is shown in the block diagram of FIGURE 1.

In the first step, the starting material is deanionized yielding an effluent with a pH in the desired range. In the second step this effluent is heated to effect isomerization and in the third step the interconversion reaction products are refined.

The starting material may be any dextrose-bearing solution. The particular material employed in a given instance will, of course, depend upon the particular properties desired in the sweet syrup product. Preferably, the starting material will be a corn syrup. The starting material should have a D.E. in the range of about 30 to about 100, preferably about 70 to about 95. One example of a preferred starting material is a corn syrup described in the above described parent application, Ser. No. 531,345. This corn syrup is prepared by subjecting an acid-thinned corn starch having a D.E. of about 15–20 to enzymatic conversion with a malt enzyme to reach a D.E. of about 35–45. The resulting malt conversion liquor is further converted with a microbial enzyme to attain a dextrose content of about 55% and a D.E. of about 75. The resulting syrup is concentrated to about 30° Baumé and refined. This refined liquor may then be employed as a starting material in the process of the present invention.

In general, the starting material will contain anions such as $Cl^-$ and $SO_4^{--}$ in the range of about 1600 to about 2900 parts per million. In the first step of the process of the present invention, these anions are substantially removed. In general, the deanionization is continued until the starting material has a pH in the range of about 8.5 to about 10, preferably about 9 to about 9.5, and the anions present are in the range of about 200 to about 900 p.p.m., preferably less than about 600 p.p.m. The deanionization is achieved by passing the starting material through a strongly basic anion exchanger such as a Dow 2X8, a Dow 21R, an Amerberlite 1R or 401, or a Permutit MP600. Preferably, the deanionization is accomplished by the use of an electrodialysis unit as further described hereinafter.

In the second step of the process, the deanionized dextrose-bearing solution is passed to an isomerization unit. This unit is of conventional design and is preferably adapted for continuous operation. For example, the unit may comprise a jacketed heat exchanger. The isomerization unit is free of catalysts, e.g. alkali. In general, the isomerization temperature is in the range of about 60° C. to about 95° C. Preferably the isomerization temperature is either in the range of about 60–65° C. or the range of about 90-95° C. The time will, of course, vary depending upon the desired degree of interconversion. Suitable isomerizations (e.g. 15–30% levulose) have been achieved, for example, at a temperature of about 92° C. in a continuous unit with a residence time of about 6–7 minutes and at about 65° C. in a batch unit with a residence time of about 2–3 hours.

In the third or final step of the process, the effluent from the isomerization unit is refined. During the refining, cations, e.g. $Na^+$, are removed, organic anions are removed, and color bodies are removed. This may be accomplished by conventional means; for example, through the combined use of a cation exchanger and a weakly basic anion exchanger. In a preferred embodiment, the same electrodialysis unit employed in the deanionization step is also employed to remove organic anions during this refining step.

As mentioned above, in a preferred embodiment of the present invention, the deanionization step is carried out in an electrodialysis unit. The same unit can be employed to remove organic anions from the interconversion reaction products. The electrodialysis unit employed is constructed from conventional elements i.e. electrodes, membranes, spacers, etc., which have been assembled, as hereinafter described, so as to provide a unit which is eminently suitable for use in the present invention.

FIGURE 2 is a cross-section view showing the arrangment of the elements employed in the electrodialysis unit. The unit will comprise a plurality, for example, 10 to 100 or more, of identical cells. The number of cells used in any particular process will of course depend upon the capacity of the cells and the size of the process. However, for the purpose of illustrating the assembly of the unit, only one cell has been shown in FIGURE 2. Each cell of the unit comprises three membranes which are separated by spacers to obtain circulation through the cell and uniform distribution at the surface of the membrane.

Referring to FIGURE 2 there is shown an anode 1 and a cathode 2. Positioned between the anode and the cathode is a cell 3 composed of membranes 4, 5, and 6. Membrane 4 is a cationic permeable membrane. Membranes 5 and 6 are both anionic permeable membranes. All membranes and electrodes are separated by spacers 7. The starting material, e.g. corn syrup, to be deanionized is circulated through the cell between anionic membranes 5 and 6. Between cationic membrane 4 and anionic membrane 5 an aqueous solution of sodium hydroxide is circulated. Between cationic membrane 4 and its associated electrode (anode 1) or the adjacent anionic membrane of the next cell (not shown) and between anionic membrane 6 and its associated electrode (cathode 2) or the adjacent cationic membrane of the next cell (not shown) an aqueous solution of salt (NaCl) is circulated. When electric voltage is applied across the electrodes of the cell, by a conventional power source (not shown) $OH^-$ ions move into the product (i.e. deanionized syrup) stream while $Cl^-$ and $SO_4^{--}$ and other mineral anions move out of the product stream into the salt stream. The membranes employed are commercially available cationic and anionic membranes. Examples of such cationic membranes are Ionics Nepton 61 A2L/61A2G and examples of such anionic membranes are Ionics Nepton 711 B2L/717E2L, or any other suitable types.

The conditions employed in operating the electrodialysis unit will of course depend upon the starting material being deanionized. In general, the conditions are determined by first measuring the conductivity of the solution to be deanionized and then choosing an optimum current density. A discussion of electrodialysis as a unit operation may be found in Encyclopedia of Chemical Technology, Kirk-Othmer, 2nd ed., vol. 7, p. 846–65.

The present invention may be further understood by reference to the following example which is included for illustrative purposes only.

EXAMPLE

A corn syrup was deanionized according to the present invention by passing it through an electrodialysis unit of the type described above. The electrodialysis unit consisted of five cells arranged as shown in FIGURE 2. The corn syrup starting material had the following analysis: D.E. 92.5, dextrose 88.8%, ash .37%, chloride 1450 p.p.m., and color 4.1 (SOL. COL. X 100). The syrup was supplied to the unit at a pressure of about 15 p.s.i. and circulated through the unit at a rate of about 200 cc. per minute. The aqueous caustic stream to the unit comprised 0.5 N NaOH and the salt stream supplied to the cell comprised .5% NaCl. The cell was operated at an amperage of about 1.5 amps and a voltage of about 13.5 volts. During the deanionization the pH of the syrup changed from 7.5 to 9.7, and the chloride content was decreased from about 1450 p.p.m. to about 300 p.p.m.

The deanionized effluent from the electrodialysis unit was then sent to an isomerization unit. This unit consisted of a jacketed, continuous heat exchanger maintained at a temperature of about 92° C. The deanionized syrup was maintained at this temperature for about 6–7 minutes. Following isomerization the interconverted syrup was passed through a cooler to bring the syrup to about room temperature. The cooled syrup was then again circulated through the electrodialysis unit where small amounts of organic anions formed during the interconversion were removed. The effluent from the electrodialysis unit was passed through a Dusarite cationic exchanger. The resulting product was a corn syrup having the following characteristics.

| | |
|---|---|
| D.E. | 92.5 |
| Dextrose content, percent | 70 |
| Levulose content, percent | 18.8 |
| Color | 2.5 |
| Chloride, p.p.m. | 180 |
| Ash, percent | .09 |

Other sweet syrups were made according to the present invention by changing slightly the starting material and the operating conditions. Analysis of the syrups produced are shown in Tables I and II.

TABLE I

| | | | | |
|---|---|---|---|---|
| D.E. | 71.4 | 73.9 | 70.3 | 68.1 |
| Dextrose, percent | 43.4 | 43.1 | 41.4 | 41.3 |
| Levulose, percent | 10.6 | 13.7 | 14.2 | 12.1 |
| Ash, percent | .08 | .004 | .09 | .041 |

TABLE II

| | | | | | |
|---|---|---|---|---|---|
| D.E. | 94.8 | 95.1 | 91.7 | 96.8 | 92.2 |
| Levulose, percent | 22.9 | 23.8 | 21 | 24.6 | 18.9 |
| Dextrose, percent | 67.5 | 67.8 | 67.2 | 71.1 | 69.2 |
| Ash, percent | .12 | .08 | .11 | .06 | .21 |

The utility of the sweet syrups produced according to the present invention will be apparent to those skilled in the art. The syrups may find use in the production of ice cream, nougats, and other applications wherein it is desirable to use a sweet syrup.

The term "sweet syrup" as employed herein is intended to mean a dextrose containing syrup which contains at least about 12–15% levulose. As used in this specification, all references to percent, is percent by weight on a dry basis.

For some sweet syrup applications it is important that the syrup be non-crystallizing (upon standing at room temperature). It is well known that the higher the dextrose content of the syrup, the greater the tendency towards crystallization. If starting materials of suitable dextrose content are used, non-crystallizing sweet syrups can be obtained directly from the process of the present invention. In addition, if the dextrose content of the sweet syrup prepared by the process is such that crystallization would occur, the syrup can be blended, for example, with a high maltose syrup having a very low dextrose content. The production of such high maltose syrups is well known. Certain economic benefits may be realized by this blending process due to the production of a non-crystallizing sweet syrup in which only a portion, e.g. 50–60% of the syrup was subjected to interconversion.

Although the present invention has been described by reference to certain specific examples, it is understood that such examples are for illustrative purposes only and that the present invention is to be limited only by the following claims.

What is claimed is:

1. In a process for preparing a sweet syrup by interconverting dextrose in a dextrose bearing solution to levulose, the improvement comprising substantially deanionizing the dextrose bearing solution prior to interconversion.

2. A process as defined by claim 1 wherein said deanionizing is effected by electrodialysis.

3. A process as defined by claim 1 wherein said deanionizing is effected by ion exchange.

4. A process as defined by claim 1 wherein the deanionizing is continued until the deanionized effluent has a pH in the range of about 8 to 10.5.

5. A process as defined by claim 1 wherein the deanionizing is continued until the deanionized effluent has a pH in the range of about 9 to 9.5.

6. A process for preparing a sweet syrup from starch conversion syrup which comprises substantially deanionizing said starch conversion syrup, isomerizing the deanionized syrup by heating at a temperature of about 60–95° C., refining the effluent from the isomerization to substantially remove mineral cations and organic anions, and recovering a sweet syrup containing at least about 12% levulose.

7. A process as defined by claim 6 wherein said isomerization step is free of alkali.

8. A process as defined by claim 6 wherein the removal of organic anions in the refining step is by electrodialysis.

References Cited

UNITED STATES PATENTS

| | | | |
|---|---|---|---|
| 2,487,121 | 11/1949 | Fetzer et al. ------ | 127—30 X |
| 2,746,889 | 5/1956 | Langlois et al. ----- | 127—41 X |
| 3,285,776 | 11/1966 | Scallet et al. -------- | 127—30 |
| 3,305,395 | 2/1967 | Scallet et al. --------- | 127—30 |
| 3,383,245 | 5/1968 | Scallet et al. ------ | 127—38 X |

MORRIS O. WOLK, Primary Examiner

D. G. CONLIN, Assistant Examiner

U.S. Cl. X.R.

127—38, 40, 41, 54; 204—138